US012633023B2

(12) United States Patent
Ota

(10) Patent No.: US 12,633,023 B2
(45) Date of Patent: May 19, 2026

(54) CORRECTION APPARATUS, METHOD AND PROGRAM FOR CORRECTING ARTIFACTS

(71) Applicant: Rigaku Corporation, Tokyo (JP)

(72) Inventor: Takumi Ota, Akishima (JP)

(73) Assignee: RIGAKU CORPORATION, Tokyo (JP)

( * ) Notice: Subject to any disclaimer, the term of this patent is extended or adjusted under 35 U.S.C. 154(b) by 363 days.

(21) Appl. No.: 18/520,601

(22) Filed: Nov. 28, 2023

(65) Prior Publication Data

US 2024/0202994 A1 Jun. 20, 2024

(30) Foreign Application Priority Data

Nov. 29, 2022 (JP) ................................ 2022-190697

(51) Int. Cl.
*G06T 11/00* (2026.01)
*G06T 7/00* (2017.01)

(52) U.S. Cl.
CPC .......... *G06T 11/008* (2013.01); *G06T 7/0002* (2013.01); *G06T 2207/10081* (2013.01);
(Continued)

(58) Field of Classification Search
CPC .... G06T 11/008; G06T 11/005; G06T 11/006; G06T 7/0002; G06T 2207/10081;
(Continued)

(56) References Cited

U.S. PATENT DOCUMENTS 8,194,961 B2 6/2012 Zou et al.
9,285,326 B2 3/2016 Gagnon et al.
(Continued)

FOREIGN PATENT DOCUMENTS

CN 116664429 A * 8/2023 .......... G06T 11/008
EP 3576048 A1 * 12/2019 .............. G06T 5/90
(Continued)

OTHER PUBLICATIONS

Abdurahman, Shiras, Robert Frysch, Richard Bismark, Steffen Melnik, Oliver Beuing, and Georg Rose. "Beam hardening correction using cone beam consistency conditions." IEEE transactions on medical imaging 37, No. 10 (2018): 2266-2277. (Year: 2018).*
(Continued)

*Primary Examiner* — Carol W Chan
(74) *Attorney, Agent, or Firm* — XSENSUS LLP

(57) ABSTRACT

The correction apparatus comprises a projection image acquiring section for acquiring a measured projection image, a virtual energy setting section for setting a virtual energy different from the measured energy that is the energy of the X-ray irradiated at the time of acquiring the measured projection image, a dual energy decomposing section for calculating a projection image under an assumed condition at the time of irradiating the X-ray of the virtual energy and performing dual energy decomposition, a consistency index evaluating section for evaluating a temporarily corrected image obtained by the dual energy decomposition with a consistency index to identify an optimum condition among the assumed conditions, and a correction image generating section for generating a projection image under the optimum condition as a corrected image.

10 Claims, 7 Drawing Sheets

(52) U.S. Cl.
CPC ............... *G06T 2207/30168* (2013.01); *G06T 2211/408* (2013.01)

(58) Field of Classification Search
CPC ..... G06T 2207/30168; G06T 2211/408; A61B 6/5258; G01N 23/046
See application file for complete search history.

(56) References Cited

U.S. PATENT DOCUMENTS

| | | | | |
|---|---|---|---|---|
| 9,366,640 | B2 | 6/2016 | Gagnon et al. | |
| 2009/0262997 | A1 | 10/2009 | Zou et al. | |
| 2013/0336443 | A1 | 12/2013 | Gagnon et al. | |
| 2014/0105354 | A1 | 4/2014 | Gagnon et al. | |
| 2015/0238160 | A1 * | 8/2015 | Flohr | A61B 6/544 378/8 |
| 2018/0110492 | A1 * | 4/2018 | Yeh | A61B 6/032 |
| 2022/0207793 | A1 * | 6/2022 | Dennerlein | G06T 11/005 |

FOREIGN PATENT DOCUMENTS

| | | | |
|---|---|---|---|
| JP | 2005245657 | A * | 9/2005 |
| JP | 2009-261942 | A | 11/2009 |
| JP | 2014-000409 | A | 1/2014 |
| JP | 2017042438 | A | 3/2017 |

OTHER PUBLICATIONS

Würfl et al., "A new calibration-free beam hardening reduction method for industrial CT", 8th Conference on Industrial Computed Tomography, 2018, pp. 1-7.
Japanese Office Action issued Jan. 20, 2026 in corresponding Japanese Patent Application No. 2022490697, 8 pages.
Haojie Zhou, et al., The synthesis of high-energy CT images from low-energy CT images using an improved cycle generative adversarial network, Quantitative imaging in Medicine and Surgery, 2022 Year 01, vol. 12, No. 1 , 28-42.
Xiaolian Guo, et al., A comparison of sampling strategies for dual energy micro-CT, Medical Imaging, 2012 year, Proc. of SPIE vol. 8313, 1-8.

* cited by examiner

CORRECTION APPARATUS, METHOD AND PROGRAM FOR CORRECTING ARTIFACTS

CROSS-REFERENCE TO RELATED APPLICATION

This application claims priority under Japanese Patent Application No. 2022-190697, filed on Nov. 29, 2022, the entire contents of Japanese Patent Application No. 2022-190697 are incorporated by reference in this application.

BACKGROUND

Field

The present disclosure relates to a correction apparatus, a method, and a program for correcting artifacts.

Description of the Related Art

CT images may have intense artifacts, such as metal artifacts. The causes include inconsistency due to the assumption of monochromatic X-rays in the reconstruction while using continuous X-rays for the measurement (beam hardening), low count in which incident X-rays are largely absorbed by the metal and almost no X-rays are detected by the detector, and contributions of scattered rays that are not assumed during the reconstruction.

Conventionally, measures using hardware or software have been taken for these. Hardware measures include the use of monochromatic X-rays for measurement and the use of a grid in front of the detector to reduce scattered rays. In addition, as a measure by software, there is a method of performing reconstruction with assumption about a reconstructed image by a sequential method.

However, if scattered rays are generated due to causes other than X-ray absorption by the photoelectric effect, the above-described measures may not sufficiently reduce artifacts. Therefore, a decomposition method is adopted to separate a component of a photoelectric effect and a component of Compton scattering at a projection image level from projection images measured respectively at high energy and low energy. (see Patent Documents 1 and 2). This method, called dual energy decomposition, reduces artifacts by using separated projection images.

On the other hand, a method is known in which an intensity distribution is corrected so that a consistency condition that the total intensity of a projection image does not depend on an angle is satisfied for a projection image whose consistency is lost due to some error factor (reference Non-Patent Document 1). This consistency condition is called a Helgason-Ludwig condition. Though the measured projection image does not satisfy the conservation law on this linear absorption coefficient due to various factors, it is a method to determine parameters of a correction function so as to satisfy the conservation law.

Patent Document

Patent Document 1: JP-A-2009-261942
Patent Document 2: JP-A-2014-000409

Non-Patent Document

Non-patent Document 1: Tobias Wurfl, Nicole Maas, Frank Dennerlein, Andreas K. Maier, "A new calibration-free beam hardening reduction method for industrial CT", 8th Conference on Industrial Computed Tomography, Wels, Austria (iCT 2018)

In the dual energy decomposition as described above, it is necessary to irradiate the sample with X-rays at two types of tube voltages to acquire measured projection images. However, if the measurement is performed with two types of tube voltages, it is necessary to take sufficient countermeasures to X-ray leakage for the apparatus as well as merely to change the voltage, and the introduction of the method is not easy. For example, when measuring with a 225 kV tube, the hardware must be strengthened to prevent X-ray leakage.

In addition, if the correction is performed so that only Helgason-Ludwig condition is satisfied, the intensity of the reconstructed images may be reversed. This is because a physically incompatible solution is chosen when attempting to solve a complex error factor at once.

SUMMARY

The present disclosure has been made in view of such circumstances, and an object of the present disclosure is to provide a correction apparatus, a method, and a program capable of obtaining a physically appropriate corrected image in which artifacts are reduced without measuring at two types of tube voltages.

(1) In order to achieve the above object, the correction apparatus of the present disclosure is a correction apparatus for correcting an artifact of a CT image and comprises a projection image acquiring section for acquiring a measured projection image, a virtual energy setting section for setting a virtual energy different from the measured energy that is the energy of the X-ray irradiated at the time of acquiring the measured projection image, a dual energy decomposing section for calculating a projection image under an assumed condition at the time of irradiating the X-ray of the virtual energy and performing dual energy decomposition, a consistency index evaluating section for evaluating a temporarily corrected image obtained by the dual energy decomposition with a consistency index to identify an optimum condition among the assumed conditions, and a corrected image generating section for generating a projection image under the optimum condition as a corrected image.

(2) Further, in the correction apparatus according to (1), the consistency index is an index indicating a degree of satisfying a Helgason-Ludwig condition.

(3) In the correction apparatus according to (1) or (2), the virtual energy setting section sets the virtual energy higher than the measured energy.

(4) In the correction apparatus according to (3), the virtual energy setting section sets the virtual energy so that a difference from the measured energy is a predetermined value or more.

(5) Further, in the correction apparatus according to any one of (1) to (4), the dual energy decomposing section uses a polynomial as a functional form of a conversion function used in calculating a projection image by irradiation X-ray of the virtual energy.

(6) Further, in the correction apparatus according to any one of (1) to (5), the dual energy decomposing section uses a linear absorption coefficient model corresponding to a measurement condition when acquiring the measured projection image.

(7) Further, in the correction apparatus according to any one of (1) to (6), the consistency index evaluating section uses a particle swarm optimization method for setting a parameter of a conversion function among the assumed conditions.

(8) Further, in the correction apparatus according to any one of (1) to (7), the virtual energy setting section uses an accepted setting of an incident X-ray distribution from a user.

(9) Further, the correction method of the present disclosure is a correction method for correcting an artifact of a CT image and comprises the following steps of acquiring a measured projection image, setting a virtual energy different from the measured energy that is the energy of the X-ray irradiated at the time of acquiring the measured projection image, calculating a projection image under an assumed condition at the time of irradiating the X-ray of the virtual energy, performing dual energy decomposition, evaluating a temporarily corrected image obtained by the dual energy decomposition with a consistency index to identify an optimum condition among the assumed conditions, and generating a projection image under the optimum condition as a correction image.

(10) Further, the correction program of the present disclosure is a correction program for correcting an artifact of a CT image and causes a computer to execute the following processes of acquiring a measured projection image, setting a virtual energy different from the measured energy that is the energy of the X-rays irradiated at the time of acquiring the measured projection image, calculating a projection image under an assumed condition at the time of irradiating the X-ray of the virtual energy, performing dual energy decomposition, evaluating a temporarily corrected image obtained by the dual energy decomposition with a consistency index to identify an optimum condition among the assumed conditions, and generating a projection image under the optimum condition as a correction image.

DETAILED DESCRIPTION

Figure 1A:
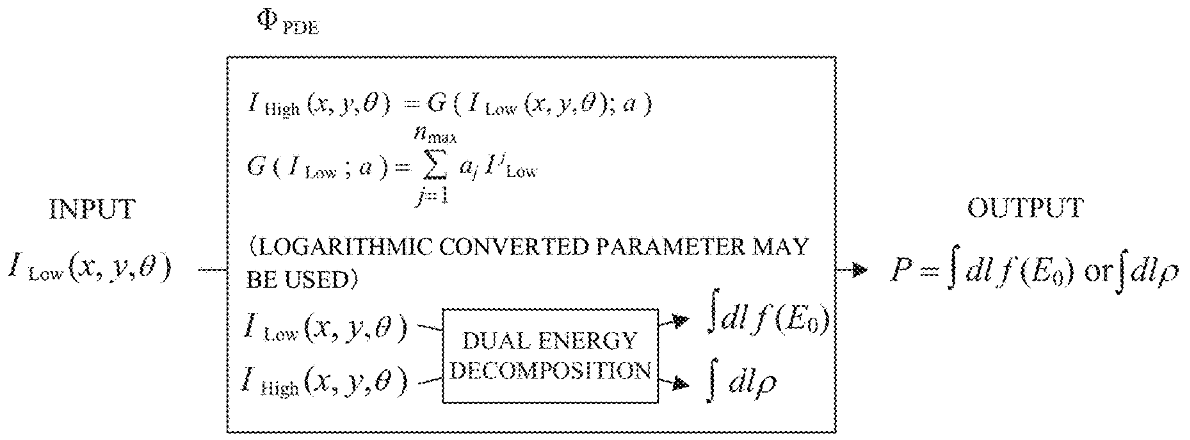
FIGS. 1A and 1B are schematic diagrams showing dual energy decomposition and an integration of linear absorption coefficient in a projection at angle k, respectively.

Next, embodiments of the present disclosure are described with reference to the drawings. To facilitate understanding of the description, the same reference numerals are assigned to the same components in the respective drawings, and duplicate descriptions are omitted.

Principle

A CT device irradiates a sample with a cone-shaped or parallel beam of X-rays from all angles, and acquires a distribution of the absorption coefficient of the X-rays, that is, a projection image, by a detector. To irradiate X-rays from any angle, the CT device is configured to rotate the sample stage with respect to the fixed X-ray source and the detector or the gantry integrated with the X-ray source and the detector.

By rotating the gantry, the distribution of the linear absorption coefficient f of the sample can be inferred from the contrast of the projection image of the sample obtained by performing projection from various angles. Then, a three-dimensional linear absorption coefficient distribution is obtained from the two-dimensional projection images. This is called reconstruction. The reconstruction is basically performed by backprojection of the projection image. When X-rays are irradiated on a sample, if scattered rays are generated due to a cause other than the photoelectric effect, the artifacts in the reconstructed image are caused. To reduce the artifacts, the intensity distribution detected by the detector is considered at first.

If it is assumed that the continuous X-ray is a collection of a finite number N of monochromatic X-rays, the incident X-ray intensity is replaced by the intensity obtained by integrating the intensity Db (b=1, 2, . . . , N) of the respective monochromatic X-rays. Further, the nonlinearity of the X-ray transmission distance and the X-ray attenuation is expressed by adding the attenuation of each monochromatic X-ray to the total energy. The intensity detected at each pixel of the detector is expressed by the following formula (1) as the sum of the intensities of the respective monochromatic X-rays attenuated by the substance.

$$I = \sum_b D_b \exp\left(-\int dlf(E_b)\right) \tag{1}$$

If it is assumed that the intensity attenuation of the X-ray is due to the photoelectric effect and Compton scattering, a composite formula using two line integrals is obtained as in formula (2) at the coordinates (including the angle) of each detector. These line integrals correspond to the distributions of the linear absorption coefficients of a reference energy $E_0$ and the projections of the density distributions. The energy-dependence of the photoelectric effect and Compton scattering is represented by the power factor and Klein-Nishina factor, respectively. If these projections are extracted, they can be treated as corrected.

$$I = \sum_b D_b \exp\left(-\int dlf(E_b) - \int dl\rho f_{KN}(E_b)\right) = \tag{2}$$

$$\sum_b D_b \exp\left(-\overbrace{s(E_b)}^{\text{POWER FACTOR}}\boxed{\int dlf(E_0)} - \overbrace{f_{KN}(E_b)}^{\text{Klein-Nishina FACTOR}}\boxed{\int dl\rho}\right)$$

RECONSTRUCTION WITH USING EITHER

If the intensities obtained by two types of tube voltages with high energy and low energy are known, two equations including two unknown quantities are established as in formulas (3) and (4). By solving these simultaneous equations, a projection image decomposed by the effect of scattering is obtained. This is a dual energy decomposition.

$$\begin{cases} I_{Low} = \sum_b D_{Low,b} \exp\left(-\int dlf(E_b) - \int dl\rho f_{KN}(E_b)\right) = \\ \sum_b D_{Low,b} \exp\left(-s(E_b)\int dlf(E_0) - f_{KN}(E_b)\int dl\rho\right) \\ I_{High} = \sum_b D_{High,b} \exp\left(-\int dlf(E_b) - \int dl\rho f_{KN}(E_b)\right) = \\ \sum_b D_{High,b} \exp\left(-s(E_b)\int dlf(E_0) - f_{KN}(E_b)\int dl\rho\right) \end{cases} \quad (3)$$

Formula (4) is a simplified representation of formula (3). This is a nonlinear simultaneous equation with unknown line integral values, which can be solved using the multivariable Newtonian method. FIG. 1A shows a schematic diagram of a dual energy decomposition. The dual energy decomposition shown in FIG. 1A can output intensity distributions with photoelectric effects only or Compton effects only for the input of intensity distributions measured at low-energy tube voltage.

$$\begin{cases} I_{Low} = F_1\left(\int dlf(E_0), \int dl\rho\right) \\ I_{High} = F_2\left(\int dlf(E_0), \int dl\rho\right) \end{cases} \quad (4)$$

In the present disclosure, one of the intensities obtained by the two types of tube voltages is acquired by actual measurement, and the other is calculated by substituting the one for the conversion function G including the parameter a (for example, formula (5)). However, the parameter a is not a single value, but means a set of plurality values $a=(a_1, \ldots, a_n)$, such as a vector. Here, $I_{low}$ is treated as a measured projection image and $I_{High}$ as a virtual projection image, but their relation may be reversed.

$$I_{High}(x, y, \theta)=G(I_{Low}(x, y, \theta); a) \quad (5)$$

By using the above formulas (4) and (5), a temporary projection image based on only one factor of intensity attenuation, for example, a photoelectric effect, can be obtained. This method should also be referred to as pseudo dual energy decomposition because it uses computational projection images to perform dual energy decomposition. For a plurality of parameters a, a plurality of temporary projection images are obtained. Then, the consistency index of each temporary projection image is calculated, and the parameter a at the time when the degree of satisfying the consistency condition is the highest is determined. Instead of formula (5), formula (6) using the value P obtained by logarithmic conversion of the intensity I of formula (5) may be used.

$$P_{High}(x, y, \theta)=G(P_{Low}(x, y, \theta); a) \quad (6)$$

If the sample is in the measurement field and the X-rays is ideally absorbed without extra error factor, the total intensity for each of the projection images should not depend on the angle. This is called consistency. The intensity detected by the detector is equivalent to the line integral of the linear absorption coefficient on the straight line between the detection position and the source. By integrating this value in the detector coordinate s, the sum of the linear absorption coefficients of the sample is obtained. If the measurement is carried out by cone-beam method, the range is limited to only the central cross section Z=0. In practice, however, the consistency is deteriorated due to some error factor. Therefore, a plausible projection image can be obtained by determining a conversion function having a high degree of satisfying the consistency condition of the projection image.

Figure 1B:
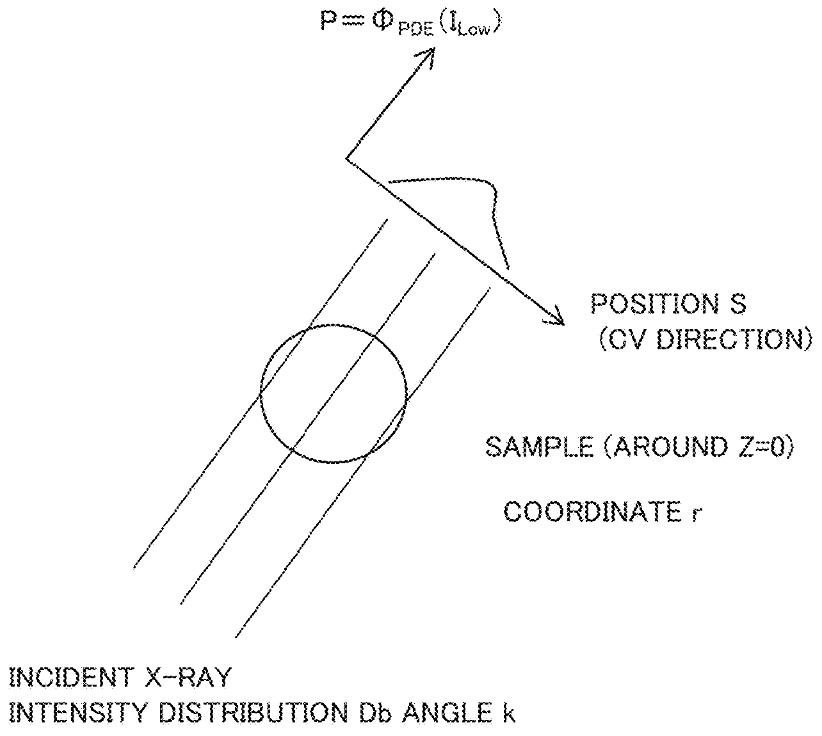

As the consistency index, for example, an index to Helgason-Ludwig consistency condition as shown in Equation (7), NRMSD (Normalized Root Mean Square Deviation), can be used. FIG. 1B is a schematic diagram showing an integration of linear absorption coefficient in a projection at angle k. $\Phi_{PDB}$ is a function for converting the projection image into a corrected projection image. The closer the integral of the projection image (the sum of the linear absorption coefficients included in the cross section) is to the invariant, the closer NRMSD is to zero.

$$M_k = \int \Phi_{PDE}(I_{Low}(s, k))ds \quad (7)$$

$$NRMSD = \sqrt{\sum_k \left(\frac{M_k}{\text{Average}_j(M_j)} - 1\right)^2}$$

$M_k$ is obtained by integrating the projection image, which is applied pseudo dual energy decomposition to the measured projection at an angle k, along the CU direction. In practice, the measurement is performed with a two-dimensional detector, so that only the central part is used for the CV direction. $\text{Average}_j(M_j)$ averages the integral with respect to angle, and j is independent of the outer k. Note that the CV direction is a direction parallel to the rotational axis, and the CU direction is a direction perpendicular to the CV direction on the detector.

When the parameter a having the highest degree of satisfying the consistency condition is determined, the condition assumed at the time is adopted as the optimum correction condition, and the projection image is calculated under the condition. Then, a reconstructed image is generated based on the corrected series of projection images. Thus, artifacts can be reduced, and a physically appropriate corrected image can be obtained.

Entire System

Figure 2:
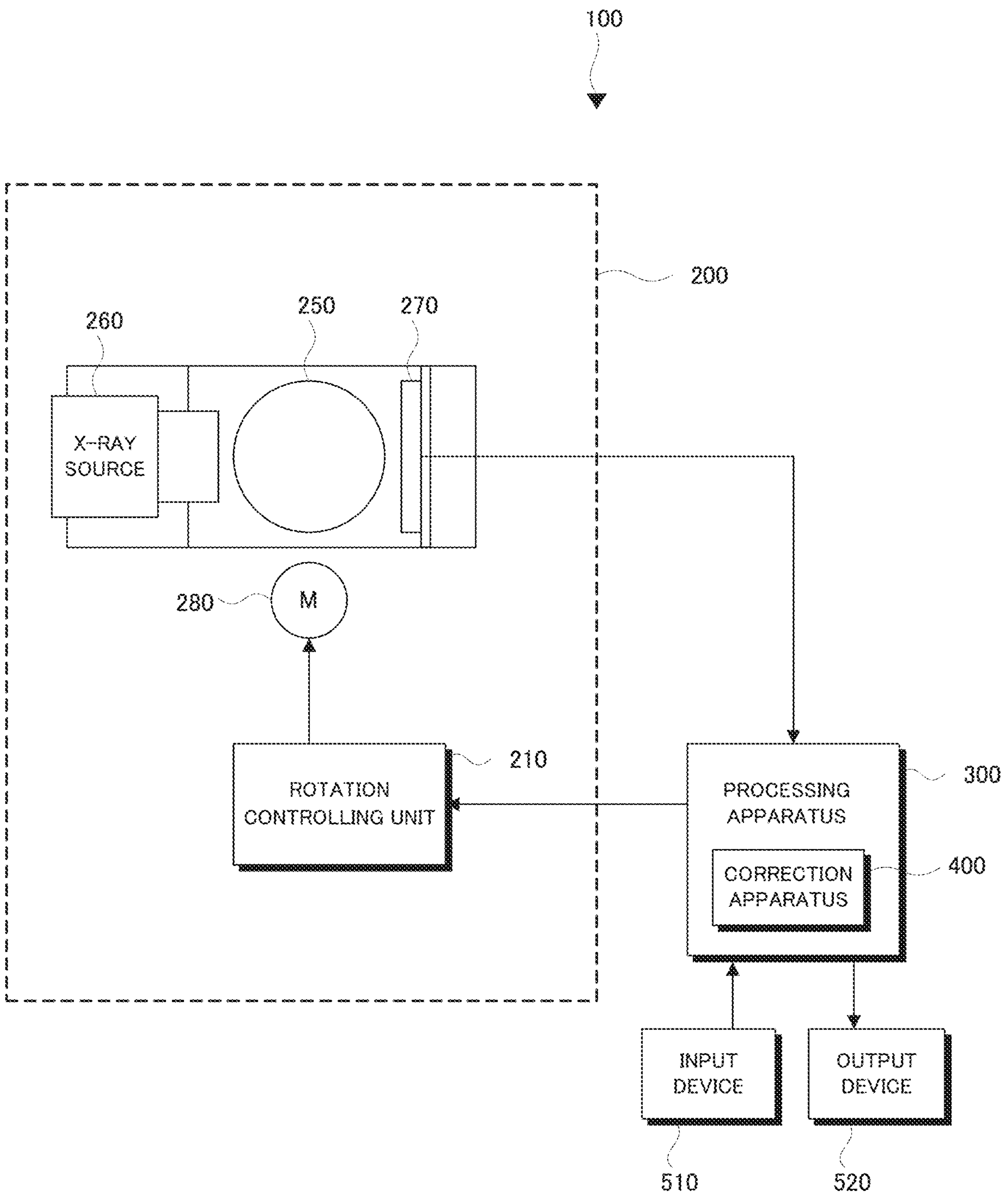
FIG. 2 is a schematic diagram showing a configuration of the entire system of the present disclosure.

FIG. 2 is a schematic diagram showing a configuration of the system 100. The system 100 comprises a CT device 200, a processing apparatus 300, an input device 510, and an output device 520. The processing apparatus 300 comprises a correction apparatus 400 and is connected to the CT device 200.

As shown in FIG. 2, the CT device 200 is configured to rotate the sample relative to the X-ray source 260 and the detector 270. The CT device 200 is not limited thereto and may be configured to rotate a gantry in which an X-ray source and a detector are integrated. The CT device 200 may be any of a device using a collimated beam and a device using a cone beam.

The processing apparatus 300 is connected to the CT device 200 and performs control of the CT device 200 and processing of the acquired data. The correction apparatus 400 corrects a projection image. The processing apparatus 300 may be a PC terminal or a server on a cloud. The input device 510 is, for example, a keyboard or a mouse, and performs input to the processing apparatus 300. The output device 520 is, for example, a display, and displays a projection image or the like.

As shown in FIG. 2, the correction apparatus 400 may be configured as a part of the functions included in the processing apparatus 300, or the correction apparatus 400 and the processing apparatus 300 may be configured as an integral unit. Note that the correction apparatus 400 may be provided as a component different from the processing apparatus 300.

CT Device

As shown in FIG. 2, the CT device 200 comprises a rotation control unit 210, a sample stage 250, an X-ray source 260, a detector 270 and a driving section 280. X-ray CT is performed by rotating the sample stage 250 installed between the X-ray source 260 and the detector 270. Note that the X-ray source 260 and the detector 270 may be installed on a gantry, and the gantry may be rotated with respect to a sample fixed to the sample stage 250.

The CT device 200 drives the sample stage 250 at a timing instructed by the processing apparatus 300 and acquires a projection image of the sample. The measurement data is transmitted to the processing apparatus 300. The CT device 200 is suitable for use in precision industrial products such as semiconductor devices, however, can be applied to an apparatus for animals as well as an apparatus for industrial products.

The X-ray source 260 emits X-rays toward the detector 270. The detector 270 has a receiving surface for receiving X-rays and can measure the intensity distribution of X-rays transmitted through the sample by a large number of pixels. The rotation control unit 210 rotates the sample stage 250 at a speed set at the time of CT measurement by the driving section 280.

Processing Apparatus

Figure 3:
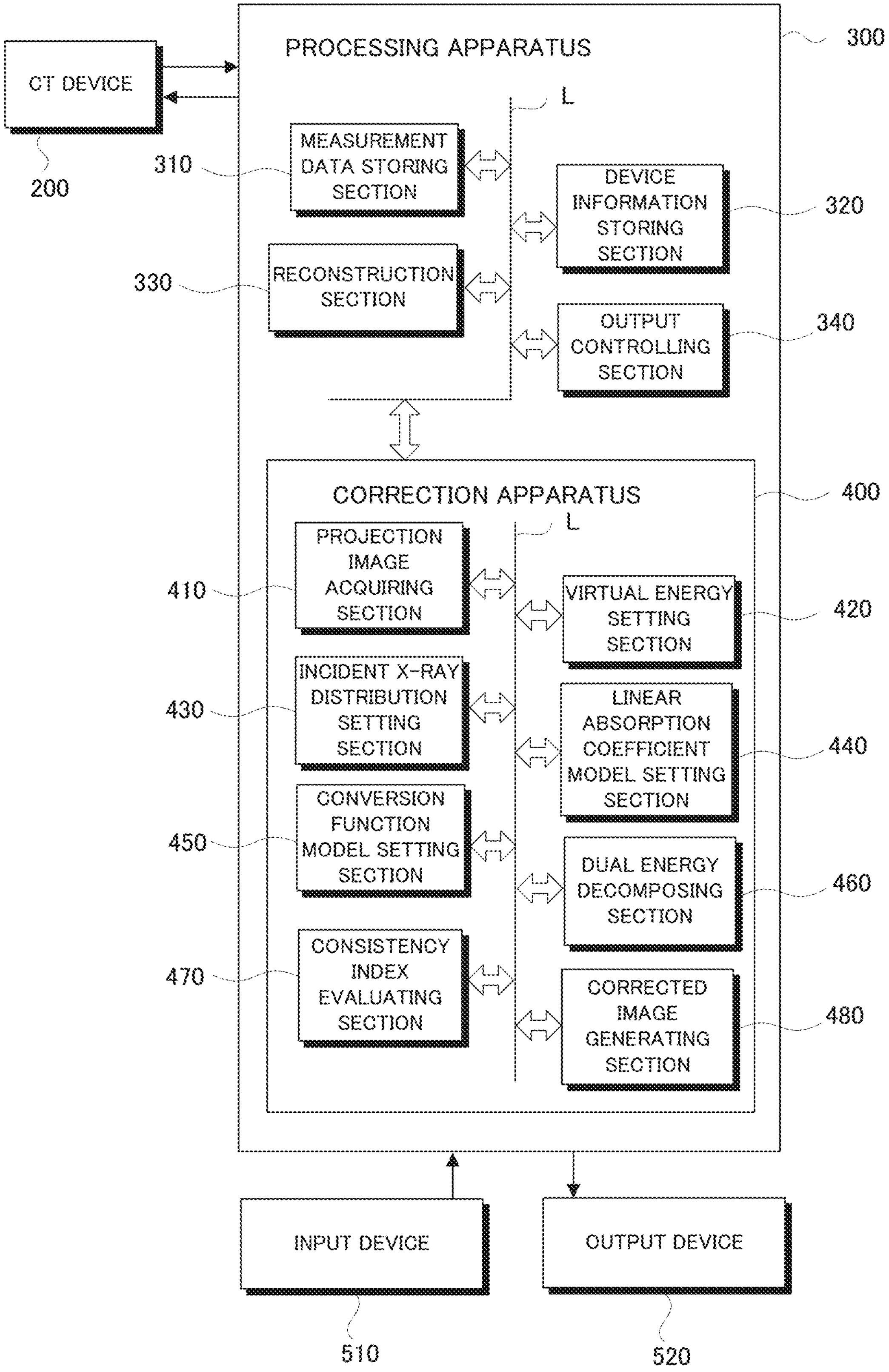
FIG. 3 is a block diagram showing the configuration of the processing apparatus of the present disclosure.

FIG. 3 is a block diagram showing a configuration of the processing apparatus 300. The processing apparatus 300 is configured by a computer formed by connecting a CPU (Central Processing Unit), a ROM (Read Only Memory), a RAM (Random Access Memory), and a memory to a bus. The processing apparatus 300 is connected to the CT device 200 and receives information.

The processing apparatus 300 comprises a measurement data storing section 310, a device information storing section 320, a reconstruction section 330, and an output controlling section 340. Each section can transmit and receive information via the control bus L. The processing apparatus 300 comprises, in part, a correction apparatus 400. The input device 510 and the output device 520 are connected to the CPU via an appropriate interface.

The measurement data storing section 310 stores measurement data acquired from the CT device 200. The measurement data include rotation angle information and corresponding projection images. The device information storing section 320 stores device information acquired from the CT device 200. The device information includes device name, beam shape, geometry at the time of measurement, scanning method, etc. The reconstruction section 330 reconstructs CT images from the series of projections. The output controlling section 340 causes the output device 520 to display the reconstructed CT images. Thus, the user can confirm the corrected CT images. In addition, the user can instruct or designate the processing apparatus, the correction apparatus, or the like based on CT images.

Correction Apparatus

The correction apparatus 400 is constituted by a computer including a CPU, ROM, RAM and a memory as a part of the processing apparatus 300. The correction apparatus 400 may be directly connected to CT device 200 or may be connected to the CT device 200 via the processing apparatus. In addition, the correction apparatus 400 may receive information from the CT device or may receive information from the processing apparatus 300.

The correction apparatus 400 comprises a projection image acquiring section 410, a virtual energy setting section 420, an incident X-ray distribution setting section 430, a linear absorption coefficient model setting section 440, a conversion function model setting section 450, a dual energy decomposing section 460, a consistency index evaluating section 470, and a corrected image generating section 480. Each section can transmit and receive information via the control bus L. When the correction apparatus 400 and the processing apparatus 300 have different configurations, the input device 510 and the output device 520 are also connected to CPU of the correction apparatus 400 via an appropriate interface. In this case, the input device 510 and the output device 520 may be different from those connected to the processing apparatus 300.

The projection image acquiring section 410 acquires a projection image measured as a correction target from the measurement data storing section 310. A series of projection images acquired by a single CT scanning is to be corrected. In particular, it is effective when there are intense artifacts in the projection image. An optimum correction condition may be obtained for each of a series of projection images, or an optimum correction condition may be obtained for a representative projection image and applied to other projection images.

The virtual energy setting section 420 sets a virtual energy different from the measured energy. The measured energy is the energy of the X-ray irradiated at the time of acquisition of the measured projection image. The virtual energy is an assumed energy different from the measured energy. For example, when the measured energy is 100 kV, 200 kV is set as the virtual energy.

In an exemplary aspect, the virtual energy is set higher than the measured energy. Thus, correction to reduce artifacts using dual energy decomposition is possible even for a device where higher energy is not available due to configurational limitations. Further, the virtual energy can be set so that the difference from the measured energy is a predetermined value or larger. Examples of the predetermined value include 60 kV. By providing a sufficient difference, a stable solution can be obtained during optimization, and the correction can be easily calculated. In principle, it is also possible to set the virtual energy smaller than the measured energy.

The incident X-ray distribution setting section 430 sets an incident X-ray distribution when the virtual energy X-rays are irradiated. In an exemplary aspect, the incident X-ray distribution setting section 430 uses the received setting of the incident X-ray distribution from the user. Thus, analysis according to the measurement conditions becomes possible, and an optimum corrected image can be obtained. Incidentally, the incident X-ray distribution of the measured energy is automatically determined by the tube voltage and filter conditions at the time of measurement.

The linear absorption coefficient model setting section 440 sets a linear absorption coefficient model used for dual energy decomposition. Basically, a model of photoelectric effect and Compton scattering may be used, but a model of Rayleigh scattering or the like may be used depending on an application target and a measurement condition. A functional form of the linear absorption coefficient used for the dual energy decomposition can be set according to the measurement condition in acquiring the measured projection image. For example, if the sample contains only two substances, such as soft tissue and bone, the model can be set using the energy dependence of the linear absorption coefficient for each of the substances. In this way, it is possible to perform analysis according to the situation by using a suitable model even under a special condition.

The conversion function model setting section 450 sets a conversion function model that converts the intensity distribution at the time of actual measurement into the intensity distribution at the time of estimation for X-ray irradiation. As a functional form of the conversion function, a polynomial is used, for example. This facilitates computation and provides physically appropriate correction results. Except the polynomial, it is also possible to use a function with positive coefficients, which is composed of a linear function and an exponential function. The parameters in the conversion function are assumed and evaluated by the consistency of the calculated temporarily corrected image. Note that each setting section may perform setting in accordance with an instruction from the user or may perform setting automatically. Further, it may perform the setting according to the situation, or may perform the setting with a predetermined one.

The dual energy decomposing section 460 calculates a projection image under an assumed condition at the time of X-ray irradiation of the virtual energy. In the calculation, the parameters of the conversion function are assumed. Then, the dual energy decomposition is performed using the intensity distribution calculated by the conversion function, and the intensity distribution under the condition assumed as the temporarily corrected image is calculated.

The consistency index evaluating section 470 specifies the optimum condition by evaluating the obtained temporarily corrected image with the consistency index. The evaluation with the consistency index is to calculate the consistency index of the obtained temporarily corrected image and to determine the parameter a when the degree of satisfying the consistency condition is the highest. In an exemplary aspect, the consistency index is an index indicating the degree of satisfying Helgason-Ludwig condition. Thus, a physically appropriate corrected image can be obtained from the temporarily corrected image generated under the assumed condition.

A particle swarm optimization method can be used to set the parameter of the conversion function. The particle swarm optimization method is a method in which a set of the positions of particles are made to be a candidate of a solution and updated while the optimum position of each particle and the optimum position of the whole group being kept. Thus, an optimum solution can be selected in the whole without falling into a local solution, and an optimum corrected image can be obtained. The gradient method and simplex method can also be used as methods of optimization.

The corrected image generating section 480 generates a projection image under the optimum condition as a corrected image. When the optimum condition is obtained, a projection image of the entire detection surface under the condition can be generated. In a case where the temporarily corrected image that has already been generated can be used, it may be used. In this way, a physically appropriate corrected image with reduced artifacts can be obtained without measuring at two tube voltages.

Measurement Method

A sample is placed in the CT device 200, and moving the rotational axis and projecting the X-ray are repeated under a predetermined condition, thereby projection images are acquired while X-rays being irradiated to the sample. The CT device 200 transmits device information such as a scanning method and the acquired projection images as measured data to the processing apparatus 300 or the correction apparatus 400. Since a projection image with virtual high energy is produced by numerical calculation after measurement, it is sufficient to carry out this measurement with one level of voltage.

Correction Method

Figure 4:
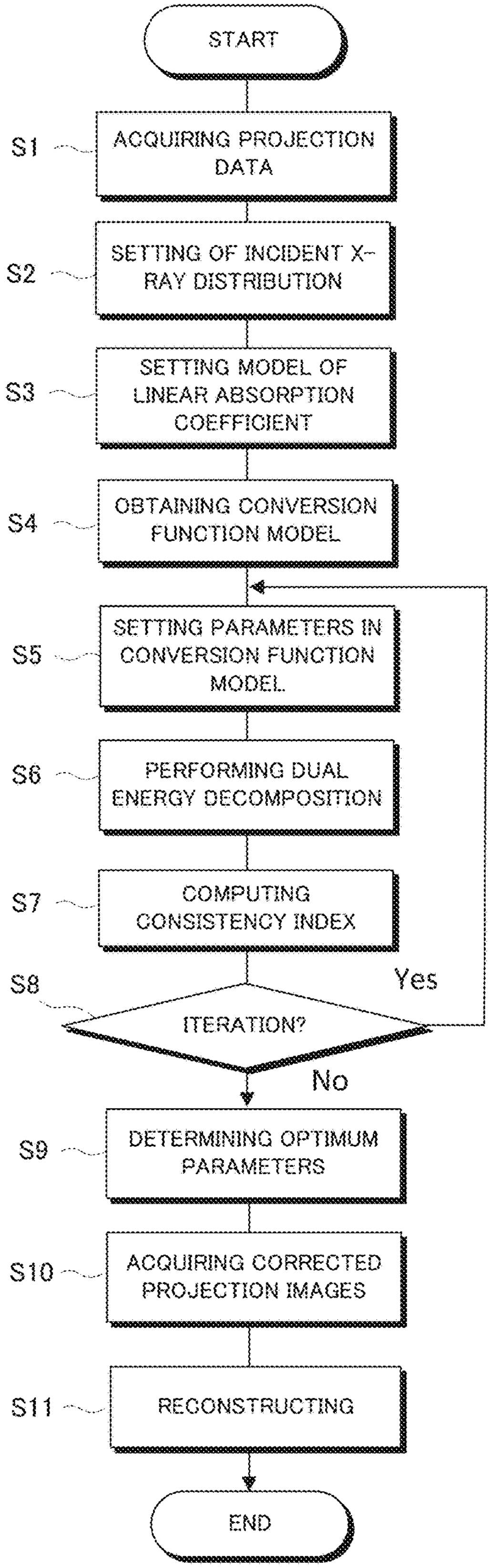
FIG. 4 is a flowchart showing a correction method of the present disclosure.

FIG. 4 is a flowchart showing the correction method. First, data of a projection image to be corrected among the measured data is acquired (step S1). Then, a virtual energy different from the measured energy is set, and an intensity distribution of the incident X-ray is set (step S2), and a model of the linear absorption coefficient is set (step S3). In this way, incident X-ray distribution with the virtual energy, the model of the linear absorption coefficient and the like are set in advance. In addition, a conversion function model which converts the intensity distribution in the measured energy into the intensity distribution in the different energy is obtained (step S4).

The parameter a of the obtained conversion function model is set (step S5), and a dual energy decomposition is performed to solve the simultaneous equations. Consequently, the intensity distribution in the virtual energy is obtained as a solution (step S6). For example, the parameter $a=(a_1, \ldots, a_n)$ can be started from a default setting of $a_1=1$ and the other being nearly zero.

Next, the consistency index of the obtained intensity distribution is calculated (step S7), and it is determined whether or not the iteration condition is satisfied (step S8). If the iteration condition is not satisfied, the process returns to the step S5. On the other hand, if the iteration condition is satisfied, the process proceeds to the step S9. By repeating the steps S5 to S7 by changing the parameter a in this manner, a consistency index for the parameter a having the plurality of parameters is calculated. In an exemplary aspect, the calculated consistency index is displayed to the user. For example, whether or not the consistency index is converging is determined as a reference of the iteration condition, and a threshold value is used for the determination. A different convergence threshold value may be set for each conversion function. In the example shown in FIG. 4, the iterative process is used, but the solution may be obtained at once by the parallel processing.

The obtained consistency index is evaluated, the optimum parameter a is determined (step S9), and the intensity distribution for the optimum parameter a is obtained as a corrected projection image (step S10). In this optimization, a particle swarm optimization method in which a plurality of sets of parameters are temporarily determined can be used and those parameters are updated in a repetitive calculation.

When the optimum parameter a is determined by the consistency index, reconstruction is performed using the obtained projection image (step S11). When the consistency index is calculated in a partial region of the detector, the pseudo dual energy decomposition is performed in the entire region after the iterative process.

GUI

Figure 5:
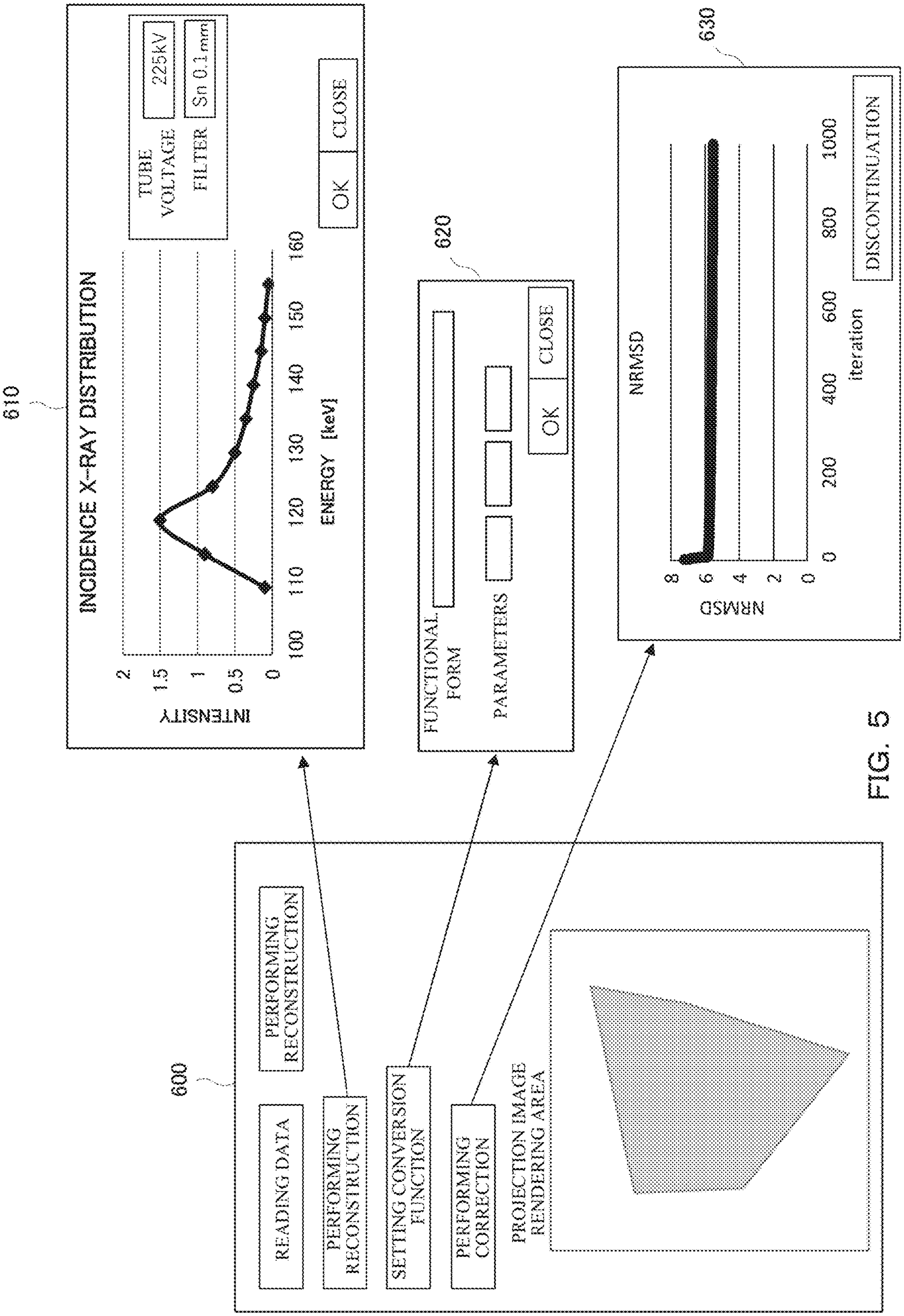
FIG. 5 is a schematic diagram showing an example of GUI.

The correction apparatus 400 can communicate with a user via the input device 510 and the output device 520. The user can recognize information on the basis of GUI displayed on the output device 520 and work for an inputting operation. FIG. 5 is a schematic diagram showing an example of GUI.

In the home screen 600 of GUI shown in FIG. 5, the image rendering area of the projection image is shown, and the data-reading, distribution-setting, conversion-function setting, correction-execution, and reconstruction-performing buttons are shown. In the image rendering area of the projection image, the projection image on the detection surface is displayed in the frame, and after the correction, the corrected projection image is displayed.

When the data-reading button is clicked, for example, a plurality of accumulated measurement data are presented, and data to be a candidate for the correction target is selectably displayed. The user can determine the correction target by selecting the measurement data.

When the distribution-setting button is clicked, a window 610 that presents an incident X-ray distribution used in the correction process is popped up. The user can confirm the presented incident X-ray distribution, adjust it if necessary, and then click OK to determine the incident X-ray distribution. For example, in the example shown in FIG. 5, the box is designed to be able to input information on tube voltage and filter. In the initial setting, a voltage higher than the actual tube voltage and an incident X-ray distribution determined from the filter condition may be displayed. Instead of inputting a numerical value, it may be designed to allow the user to move a point of the graph.

When the button for setting the conversion function is clicked, a window 620 presenting the functional form and parameters is popped up. The user can confirm the presented functional form and its parameters, adjust them if necessary, and then click OK to determine the functional form and its parameters. Note that the parameters prepared in advance may be used without being input.

When the button for executing correction is clicked, a correction process is executed, and a window 630 indicating a graph of the consistency index for the number of iterations or the parameter is popped up. This graph represents the progress of the correction. The user can confirm whether the iterative process is converging and whether the optimum parameter is appropriate. When the iterative process is converged, the corrected projection image is displayed in the projection image rendering area. Further, when a button for performing reconstruction is clicked, a reconstructed image is generated using the corrected series of projection images and displayed on the screen.

Example

Figure 6A:
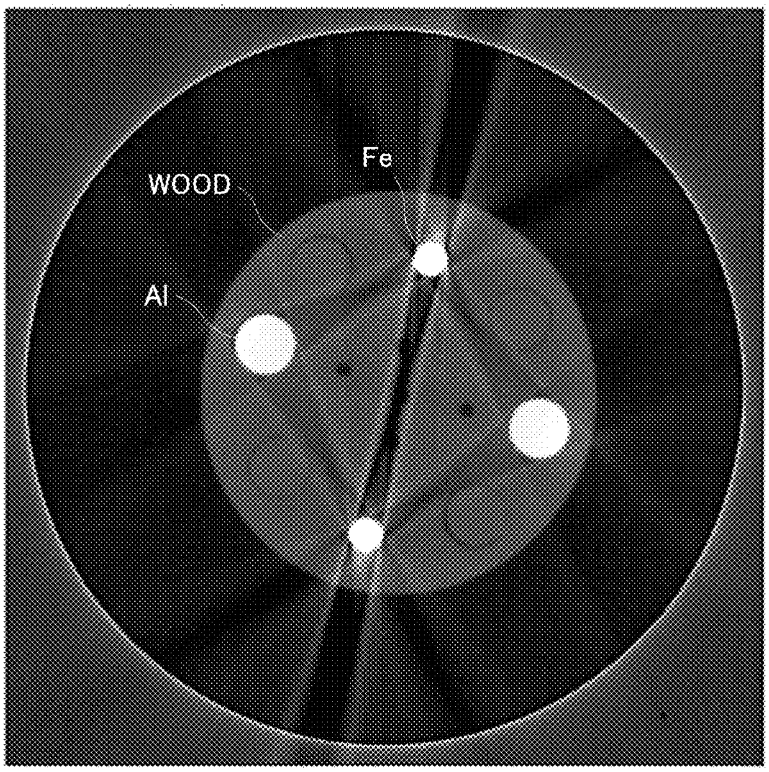
FIGS. 6A and 6B are reconstructed images using respectively uncorrected and corrected projection images in which a composite sample C1 is imaged.
Figure 6B:
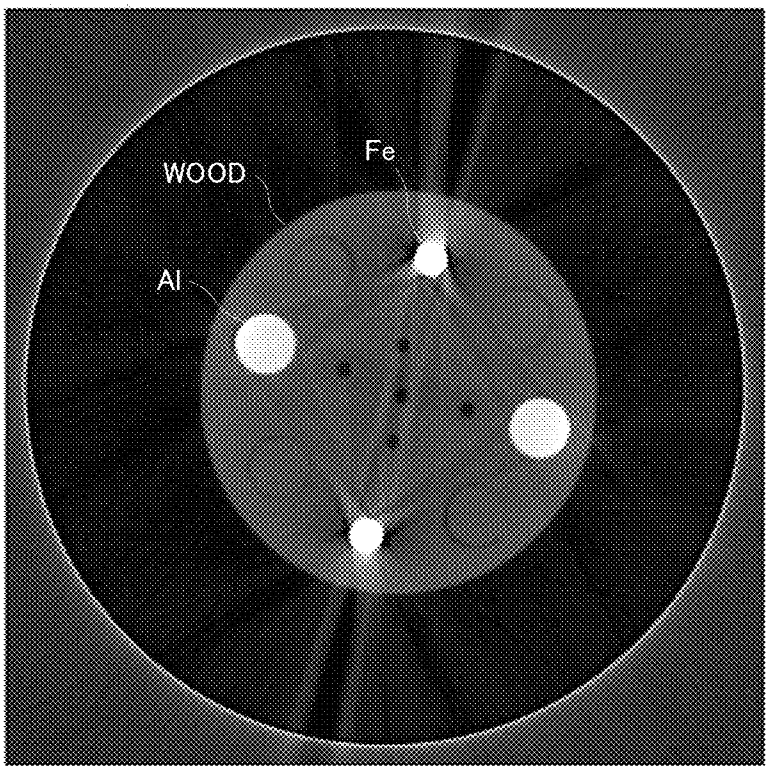

In fact, the projection image of a composite sample C1, in which four pieces made of one of two metals (Al and Fe) were inserted into the wood, was corrected. FIGS. 6A and 6B are reconstructed images using respectively uncorrected and corrected projection images in which a composite sample C1 is imaged.

As shown in FIG. 6A, it can be seen that in the uncorrected projection image, intense black streaks occur between the metals. On the other hand, as shown in FIG. 6B, in the reconstructed image using the corrected projection image, streaks are reduced, and it is possible to easily identify a plurality of holes in the vicinity of the center of the wood.

Comparative Example

Figure 7:
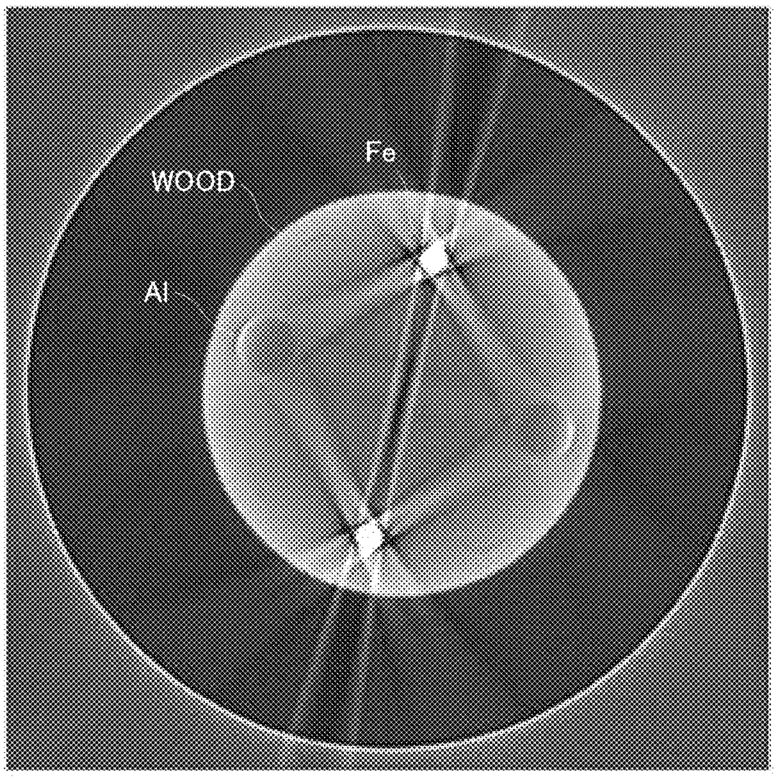
FIG. 7 is a reconstructed image using a corrected projection images based only on the Helgason-Ludwig consistency condition.

For the composite sample C1, the projection image was corrected using only the Helgason-Ludwig consistency condition. FIG. 7 is a reconstructed image using a corrected projection images based only on the Helgason-Ludwig consistency condition. In the projection image shown in FIG. 7, an area having a linear absorption coefficient smaller than that of the wood is occurred in the Al section. Also, the hole in the center of the wood is not visible. As described above, it can be seen that the correction is insufficient as compared with the reconstructed image using the corrected projection image shown in FIG. 6B.

Description of Symbols

100 system
200 CT device
210 rotation controlling unit
250 sample stage
260 X-ray source
270 detector
280 driving section
300 processing apparatus
310 measurement data storing section
320 device information storing section
330 reconstruction section
340 output controlling section
400 correction apparatus
410 projection image acquiring section
420 virtual energy setting section
430 incident X-ray distribution setting section
440 linear absorption coefficient model setting section
450 conversion function model setting section
460 dual energy decomposing section
470 consistency index evaluating section
480 corrected image generating section
L control bus
510 input device
520 output device
600 home screen
610 to 630 presentation screen (window)
C composite sample
a parameter
Db incident intensity profiles of respective monochromatic X-rays
G conversion function
NRMSD index

What is claimed is:

1. A correction apparatus for correcting an artifact of a computed tomography (CT) image, comprising:
processing circuitry configured to
acquire a measured projection image,
set a virtual energy different from a measured energy that is an energy of an X-ray irradiated at a time of acquiring the measured projection image,
calculate a projection image under an assumed condition at a time of irradiating an X-ray of the virtual energy and performing dual energy decomposition,
evaluate a temporarily corrected image obtained by the dual energy decomposition with a consistency index to identify an optimum condition among assumed conditions, and
generate a projection image under the optimum condition as a corrected image.

2. The correction apparatus according to claim 1,
wherein the consistency index is an index indicating a degree of satisfying a Helgason-Ludwig condition.

3. The correction apparatus according to claim 1, wherein the processing circuitry is further configured to
set the virtual energy higher than the measured energy.

4. The correction apparatus according to claim 3, wherein the processing circuitry is further configured to
set the virtual energy so that a difference from the measured energy is a predetermined value or more.

5. The correction apparatus according to wherein the processing circuitry is further configured to
use a polynomial as a functional form of a conversion function used in calculating the projection image by the irradiation of the X-ray of the virtual energy.

6. The correction apparatus according to claim 1, wherein the processing circuitry is further configured to
use a linear absorption coefficient model corresponding to a measurement condition when acquiring the measured projection image.

7. The correction apparatus according to claim 1, wherein the processing circuitry is further configured to
use a particle swarm optimization method for setting a parameter of a conversion function among the assumed conditions.

8. The correction apparatus according to claim 1, wherein the processing circuitry is further configured to
use an accepted setting of an incident X-ray distribution from a user.

9. A correction method for correcting an artifact of a computed tomography (CT) image, comprising:
acquiring a measured projection image,
setting a virtual energy different from a measured energy that is an energy of an X-ray irradiated at a time of acquiring the measured projection image,
calculating a projection image under an assumed condition at a time of irradiating an X-ray of the virtual energy,
performing dual energy decomposition,
evaluating a temporarily corrected image obtained by the dual energy decomposition with a consistency index to identify an optimum condition among assumed conditions, and
generating a projection image under the optimum condition as a correction image.

10. A non-transitory computer readable recording medium having recorded thereon a correction program for correcting an artifact of a computed tomography (CT) image, the program causing a computer to execute the following processes of:
acquiring a measured projection image,
setting a virtual energy different from a measured energy that is an energy of an X-ray irradiated at a time of acquiring the measured projection image,
calculating a projection image under an assumed condition at a time of irradiating an X-ray of the virtual energy,
performing dual energy decomposition,
evaluating a temporarily corrected image obtained by the dual energy decomposition with a consistency index to identify an optimum condition among assumed conditions, and
generating a projection image under the optimum condition as a correction image.

* * * * *